(12) United States Patent
Mariman et al.

(10) Patent No.: US 7,472,660 B2
(45) Date of Patent: Jan. 6, 2009

(54) SEED TUBE FOR AN AGRICULTURAL SEEDING MACHINE

(75) Inventors: Nathan A. Mariman, Geneseo, IL (US); Mark S. Sommer, East Moline, IL (US); James R. Peterson, Annawan, IL (US); Donald K. Landphair, Bettendorf, IA (US); William G. Bultinck, Andover, MN (US)

(73) Assignee: Deere & Company, Moline, IL (US)

( * ) Notice: Subject to any disclaimer, the term of this patent is extended or adjusted under 35 U.S.C. 154(b) by 374 days.

(21) Appl. No.: 11/250,655

(22) Filed: Oct. 13, 2005

(65) Prior Publication Data

US 2007/0084387 A1 Apr. 19, 2007

(51) Int. Cl.
*A01C 7/00* (2006.01)
*A01C 9/00* (2006.01)
(52) U.S. Cl. ........................ 111/174; 111/903
(58) Field of Classification Search ................ 111/170, 111/174, 200, 903, 904
See application file for complete search history.

(56) References Cited

U.S. PATENT DOCUMENTS

| 4,627,840 A | * | 12/1986 | Cuadra et al. ............... 604/151 |
| 5,533,458 A | | 7/1996 | Bergland et al. ............ 111/200 |
| 5,931,105 A | | 8/1999 | Luxon ........................ 111/170 |
| 5,967,866 A | * | 10/1999 | Willows et al. ............... 440/76 |
| 6,078,635 A | | 6/2000 | DuBois ......................... 377/6 |
| 6,093,926 A | | 7/2000 | Mertins et al. ........... 250/222.1 |
| 6,158,363 A | | 12/2000 | Memory et al. ............. 111/176 |
| 6,332,413 B1 | | 12/2001 | Stufflebeanm et al. ...... 111/170 |
| 6,872,933 B2 | | 3/2005 | Wirthlin ..................... 250/229 |
| 2001/0022342 A1 | * | 9/2001 | Wirthlin ..................... 250/229 |
| 2005/0139756 A1 | | 6/2005 | Brickey et al. ........... 250/231.1 |

FOREIGN PATENT DOCUMENTS

GB      2223048 A  *  3/1990

* cited by examiner

*Primary Examiner*—Christopher J. Novosad
(74) *Attorney, Agent, or Firm*—Taylor & Aust, P.C.

(57) ABSTRACT

A seed tube for an agricultural seeding machine includes a side wall having at least a portion thereof formed from a transparent material. A sensor includes a transmitter which is positioned adjacent an outside of the side wall, and operates through the transparent material.

25 Claims, 3 Drawing Sheets

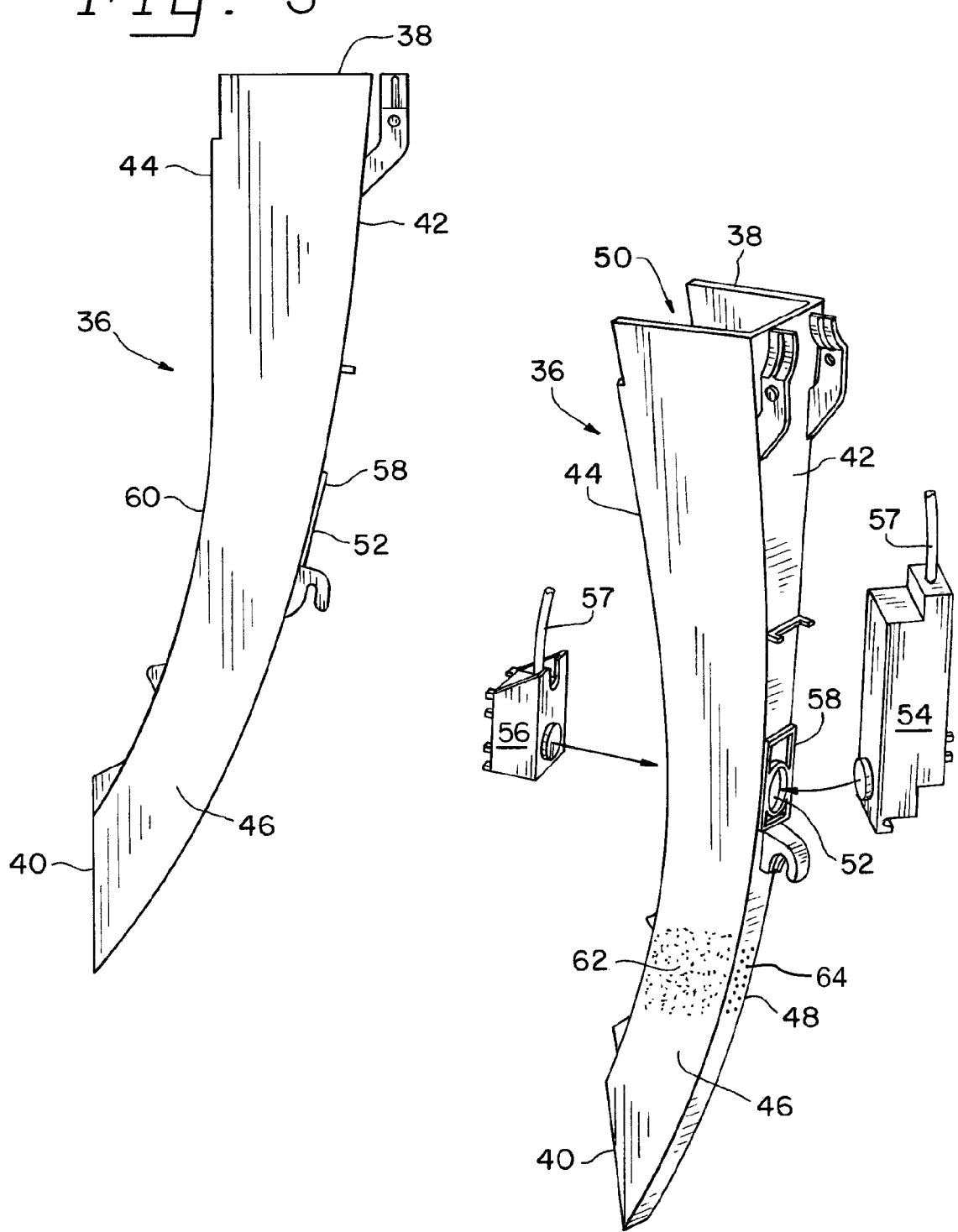

SEED TUBE FOR AN AGRICULTURAL SEEDING MACHINE

FIELD OF THE INVENTION

The present invention relates to agricultural seeding machines, and, more particularly, to seed tubes for such seeding machines.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper and insecticide hopper. If a granular herbicide and insecticide are used, the metering mechanisms associated with dispensing the granular product into the seed trench are relatively simple. On the other hand, the mechanisms necessary to properly meter the seeds, dispense the seeds at a predetermined rate and place the seeds at predetermined relative locations within the seed trench are relatively complicated.

The mechanisms associated with metering and placing the seeds generally can be divided into a seed metering system and a seed placement system which are in communication with each other. The seed metering system, also referred to herein as a seed meter, receives the seeds in a bulk manner from the seed hopper carried by the frame. Different types of seed meters may be used such as seed plates, finger plates, and seed discs. In the case of a seed disc metering system, a seed disc is formed with a plurality of seed cells spaced about the periphery thereof. Seeds are moved into the seed cells, with one or more seeds in each seed cell depending upon the size and configuration of the seed cell. A vacuum or positive pressure air may be used in conjunction with the seed disc to assist in movement of the seeds into the seed cells. The seeds are singulated and discharged at a predetermined rate to the seed placement system.

The seed placement system may be categorized as a gravity drop system or a power drop system. A seed placement system of the power drop variety generally can be classified as a seed conveyor belt drop, rotary valve drop, chain drop or air drop. Such power drop systems are known and thus not described further.

In the case of a gravity drop system, a seed tube has an inlet end which is positioned below the seed metering system. The singulated seeds from the seed metering system merely drop into the seed tube and fall via gravitational force from a discharge end thereof into the seed trench. The seed tube may be curved in a rearward manner to assist in directing seed into the seed trench. The rearward curvature also assists in reducing bouncing of the seeds back and forth within the tube as it falls therethrough into the seed trench. Further, the rearward curvature reduces bouncing of the seed as it strikes the bottom of the seed trench.

To ensure that the planting unit is operating correctly, the seed tube may be provided with a seed sensor. A light is projected from a light source across the hollow interior of the seed tube to a light receiver located in an aperture of the front wall. When a seed passes between the light source and the light receiver, the seed interrupts the light beam and the seed is detected.

The light source and light receiver are designed to extend into the apertures and be substantially even with the interior surfaces of the front and rear walls. However, sometimes the sensor may extend past the interior surface of the front wall. In this situation, the seed may impact the top edge of the sensor, possibly damaging the seed and deflecting the seed trajectory into the seed trench.

What is needed in the art is a seed tube with a sensor which operates effectively, yet does not interfere with seed drop through the seed tube.

SUMMARY OF THE INVENTION

The present invention provides a seed tube having side walls which are at least in part transparent, and a sensor having a transmitter which is positioned on the outside of the seed tube and operates through the transparent side wall.

The invention comprises, in one form thereof, a seed tube for an agricultural seeding machine which includes a side wall having at least a portion thereof formed from a transparent material. A sensor includes a transmitter which is positioned adjacent an outside of the side wall, and operates through the transparent material.

BRIEF DESCRIPTION OF THE DRAWINGS

FIG. 2 is a perspective view of the seed tube shown in FIG. 1;

FIG. 3 is a side view of the seed tube shown in FIGS. 1 and 2; and

DETAILED DESCRIPTION OF THE INVENTION

Figure 1:
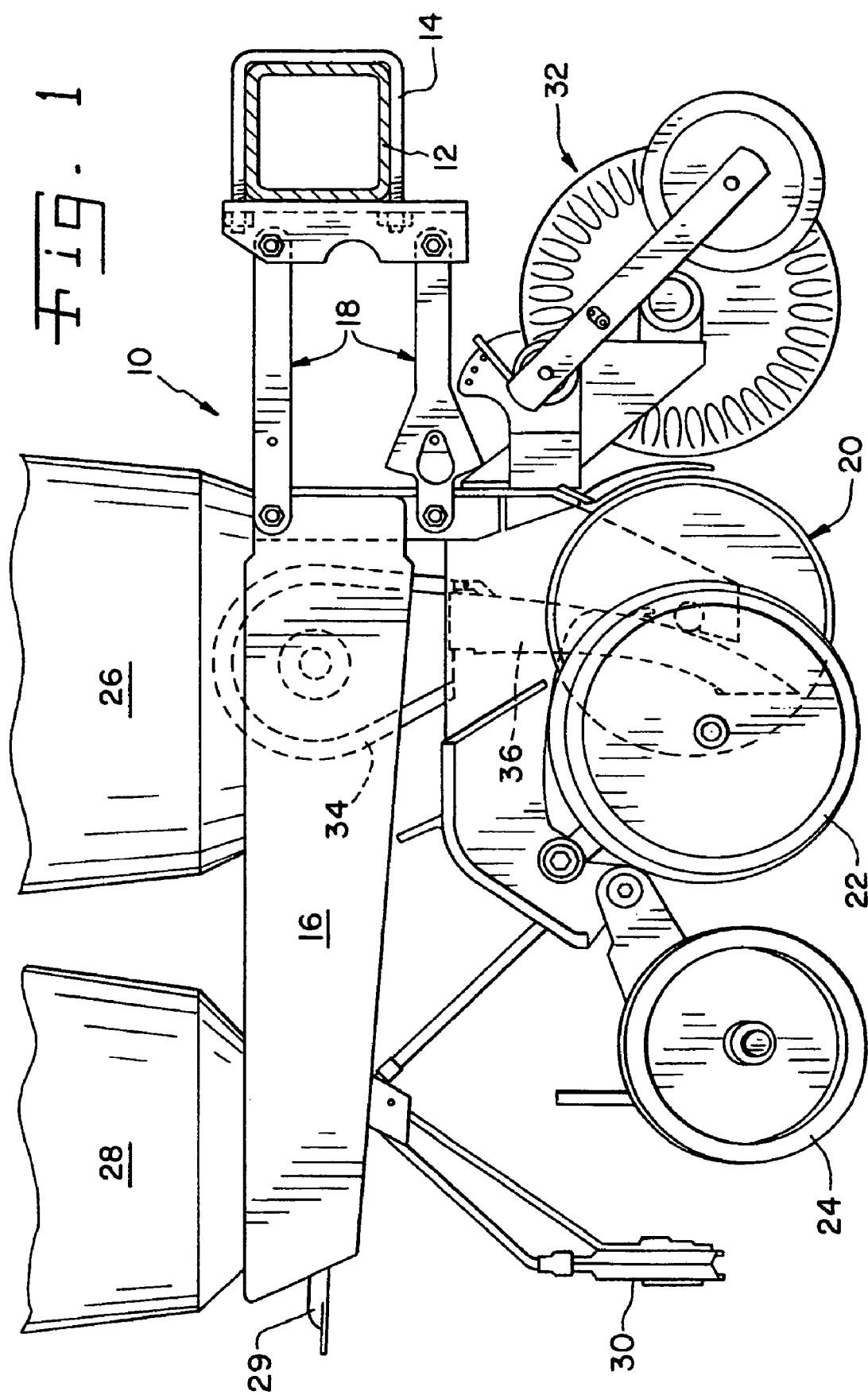
FIG. 1 is a side view of a portion of a seeding machine including an embodiment of a seed tube of the present invention.

Referring now to the drawings, and more particularly to FIG. 1, there is shown an embodiment of a seeding machine 10 of the present invention. In the embodiment shown, seeding machine 10 is in the form of a row crop planter but may also be in the form of a grain drill, etc. FIG. 1 illustrates a single row crop unit of a multi-row planter, with each row crop unit being substantially identical and connected to a common tool bar 12 using U-bolts 14. Only a single row crop unit is shown for simplicity sake.

Each row crop unit includes a multi-part frame 16 which is attached to tool bar 12 by parallel linkage 18. Tool bar 12 is coupled to a traction unit (not shown), such as an agricultural tractor. For example, tool bar 12 may be coupled to an agricultural tractor using a 3-point hitch assembly. Tool bar 12 may be coupled with transport wheel assemblies, marker arms, etc. which may be of conventional design and not shown for simplicity sake. The transport wheels, in known manner, may provide ground drive to the row crop unit through the use of shafts, chains, sprockets, transfer cases, etc.

Frame 16 carries a double disc furrow opener 20 for forming a seed trench in soil, and a pair of gauge wheels 22 positioned adjacent to the outside of each respective disc of double disc furrow opener 20. Each gauge wheel 26 may be vertically adjusted to adjust the depth of the trench which is cut into the soil using double disc furrow opener 20. Frame 16 also carries a pair of closing wheels 24 positioned generally in line with double disc furrow opener 20.

Frame 16 also carries a seed hopper 26 and chemical hopper 28. A chemical meter 29 directs chemicals from chemical hopper 28 to a chemical applicator 30. The particular planting unit shown in FIG. 1 is in the form of a no-till planter having coultered no-till opening disks 32 for management of debris on the ground.

Seed meter 34 is positioned in communication with and receives seed from seed hopper 26. Seed meter 34 singulates the seeds and provides the seeds at a predetermined rate to seed tube 36. The seed falls through seed tube 36 and is deposited into the planting furrow formed by furrow opener 20.

Figure 4:
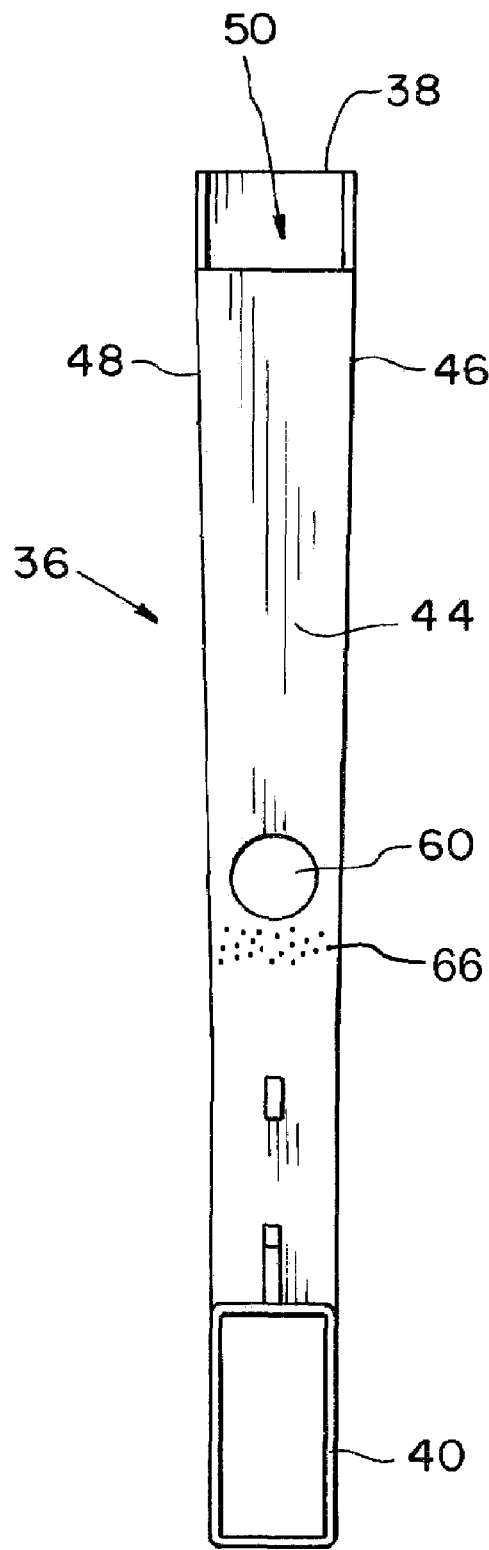
FIG. 4 is a rear view of the seed tube shown in FIGS. 1-3.

Referring now to FIGS. 2-4, seed tube 36 will be described in greater detail. Seed tube 36 includes an open inlet end 38, an open outlet end 40, and four side walls 42, 44, 46 and 48 defining a hollow interior 50. Side wall 42 defines a front wall of seed tube 36 and side wall 44 defines a rear wall of seed tube 36 (with respect to the direction of travel of seeding machine 10). Front wall 42 and rear wall 44 are each curved in the rearward direction to deposit the seed in the seed trench while reducing the tendency of the seed to bounce out of the seed trench.

Approximately midway along the length of front wall 42 is a sensor pocket 52 which is sized and shaped to receive a sensor 54 forming half of a sensor pair which cooperate together to sense individual seeds passing through seed tube 36. In the embodiment shown, the sensor includes a transmitter 54 and receiver 56. Transmitter 54 is in the form of a light source and receiver 56 is in the form of a light receiver. More particularly, light source 54 is in the form of a light emitting diode (LED). LED 54 and light receiver 56 are connected to a seed population monitor in the tractor cab by suitable electrical leads 57. Sensors including LED's and light receivers for use in seed tubes are known and thus not described further.

Sensor pocket 52 is in the form of a circular upstanding wall extending from front wall 42. This circular shape matches with the external shape of LED 54, and allows a seal or adhesive (not specifically shown) to be used for hermetic sealing between LED 54 and front wall 42. Of course, the shape of sensor pocket 52 can vary depending upon the particular sensor utilized.

Surrounding sensor pocket 52 is a sensor mount 58 which provides mechanical structure for attachment with and mounting of LED 54. Again, the particular configuration of sensor mount 58 can vary depending upon the application.

Approximately midway along the length of rear wall 44 is a sensor pocket 60 which is sized and shaped to receive light receiver 56. In contrast with sensor pocket 52 described above carrying LED 54, sensor pocket 60 is merely in the form of a hole extending through rear wall 44 (although it could include an upstanding wall if desirable). Because the seed falls via gravity and rides along front wall 42, light receiver 56 can extend through rear wall 44, for reasons that will become more apparent hereinafter. Light receiver 56 and LED 54 are held in place using a tie strap (not shown) or any other suitable fastening technique.

According to an aspect of the present invention, LED 54 does not extend through front wall 42 to be exposed within hollow interior 50 of seed tube 36. Rather, the portion of front wall 42 within sensor pocket 52 is substantially transparent to light emitted from LED 54. In the embodiment shown, the transparent material within sensor pocket 52 is of the same type of material as the remainder of seed tube 36. For example, the material may be a plastic material with a tinting agent that allows the particular frequency light from LED 54 to pass therethrough, while at the same time substantially preventing ambient light at a different frequency from passing therethrough. In this manner, the area within sensor pocket 52 acts as a "window" allowing light from LED 54 to pass therethrough, while the remainder of seed tube 36 blocks ambient light from passing therethrough. An example of such a material is polycarbonate, smoked using approximately 1 to 5% colorant. Ambient light can interfere with operation of sensor 54, 56 and therefore it is desirable to block ambient light to a reasonable extent. To further assist in blocking ambient light, the outside surface of seed tube 36 in the area outside of sensor pocket 52 can be formed with a textured surface, shown on a portion of seed tube 36 and represented by reference numbers 62 and 64 in FIG. 2 and 66 in FIG. 4.

By forming seed tube 36 from the same selected material which is both transparent to sensor 54, 56 but opaque to ambient light, the inside surface of seed tube 36 adjacent LED 54 is a continuous, non-disjoint substantially smooth surface which does not present any surface or edge against which the seeds may impinge and be damaged or deflected. This ensures that undamaged seeds are properly placed within the seed trench.

In another embodiment of the present invention, the portion of seed tube 36 lying at the bottom of sensor pocket 52 can be formed from a material which is different than the material from which the remainder of seed tube 36 is formed. For example, the portion at the bottom of seed tube 36 can be formed from a clear plastic material or glass which does not interfere with the operation of sensor 54, 56. The separate material forming the window at the bottom of sensor pocket 52 is positioned such that the inside surface of hollow interior 50 is continuous and non-disjoint. With this embodiment, except in a cross-sectional view through sensor pocket 52 showing the different materials, seed tube 36 otherwise appears as shown in FIGS. 2-4.

In the embodiment shown and described above, seed tube 36 is formed from a tinted plastic material which is opaque to ambient light and transparent to sensor 54, 56. It may also be possible to form the remainder of seed tube 36 outside the area of sensor pocket 52 with a material which is opaque to both ambient light and sensor 54, 56 in the case of a separate transparent window. Further, it may also be possible to form the entire seed tube 36 from a material transparent to sensor 54, 56 (such as clear plastic) and then coat the area of seed tube 36 outside the area of sensor pocket 52.

Moreover, in the embodiment shown, only LED 54 of sensor 54, 56 is positioned adjacent a transparent window of seed tube 36, and light receiver 56 is positioned within a hole formed in rear wall 44. However, it is also possible to position each of LED 54 and light receiver 56 adjacent a transparent window.

Having described the preferred embodiment, it will become apparent that various modifications can be made without departing from the scope of the invention as defined in the accompanying claims.

The invention claimed is:

1. A seed tube, through which individual seeds pass, for an agricultural seeding machine, said seed tube comprising:
   a side wall having a continuous non-disjoint substantially smooth surface exposed to said seeds and including at least a portion thereof comprised of a substantially transparent material; and
   a sensor including a transmitter, said transmitter positioned adjacent an outside of said side wall, and operating through said transparent material to detect passage of individual seeds through said seed tube.

2. The seed tube of claim 1, wherein said transparent material is opaque to ambient light and transparent to said transmitter.

3. The seed tube of claim 1, wherein said side wall includes a window comprised of said transparent material, a remainder of said side wall being opaque to ambient light.

4. The seed tube of claim 3, wherein said remainder of said side wall comprises one of an opaque material, a transparent material with opaque tinting, and a transparent material with an opaque coating.

5. The seed tube of claim 1, wherein said side wall includes a sensor mount.

6. The seed tube of claim 5, wherein said sensor mount includes a sensor pocket.

7. The seed tube of claim 6, further including one of a seal and an adhesive between said sensor and said sensor pocket.

8. The seed tube of claim 1, wherein said transparent material comprises a substantially clear plastic material.

9. The seed tube of claim 1, wherein said transparent material comprises one of a plastic material and glass.

10. The seed tube of claim 1, wherein said transmitter comprises a light source.

11. The seed tube of claim 10, wherein said light source comprises an LED.

12. The seed tube of claim 1, wherein said side wall comprises a front wall.

13. The seed tube of claim 1, wherein said side wall includes an outer surface which is textured in an area away from said sensor.

14. A seed tube, through which individual seeds pass, for an agricultural seeding machine, said seed tube comprising a front wall and a rear wall defining a hollow interior therebetween, at least one of said front wall and said rear wall having a continuous non-disjoint substantially smooth surface exposed to said seeds and including at least a portion thereof comprised of a substantially transparent material, and a sensor mount positioned in association with said transparent material on a side opposite said hollow interior to detect passage of individual seeds through said tube.

15. The seed tube of claim 14, wherein at least one of said front wall and said rear wall include a window comprised of said transparent material, a remainder of said front wall and said rear wall being configured opaque.

16. The seed tube of claim 15, wherein said remainder of said front wall and said rear wall comprises one of an opaque material, a transparent material with opaque tinting, and a transparent material with an opaque coating.

17. The seed tube of claim 14, wherein at least one of said front wall and said rear wall includes a sensor mount.

18. The seed tube of claim 14, wherein each of said front wall and said rear wall has an outer surface which is textured in an area away from each said sensor.

19. An agricultural seeding machine, comprising:
a seed meter; and
a seed tube positioned to receive individual seeds from said seed meter for passage through said seed tube, said seed tube including:
a side wall having a continuous non-disjoint substantially smooth surface exposed to said seeds and including at least a portion thereof comprised of a substantially transparent material; and
a sensor including a transmitter, said transmitter positioned adjacent an outside of said side wall, and operating through said transparent material to detect passage of individual seeds through said seed tube.

20. The agricultural seeding machine of claim 19, wherein said side wall includes a window comprised of said transparent material, a remainder of said side wall being configured opaque.

21. The agricultural seeding machine of claim 20, wherein said remainder of said side wall comprises one of an opaque material, a transparent material with opaque tinting, and a transparent material with an opaque coating.

22. The agricultural seeding machine of claim 19, wherein said side wall includes a sensor mount.

23. The agricultural seeding machine of claim 22, wherein said sensor mount includes a sensor pocket.

24. The agricultural seeding machine of claim 23, further including one of a seal and an adhesive between said sensor and said sensor pocket.

25. The agricultural seeding machine of claim 19, wherein said side wall has an outer surface which is textured in an area away from said sensor.

* * * * *